United States Patent [19]

Furubayashi et al.

[11] Patent Number: 4,838,606

[45] Date of Patent: Jun. 13, 1989

[54] DOOR GUARD BAR

[75] Inventors: Tadashi Furubayashi, Yokohama; Kazuo Yamada, Zushi; Hitoshi Fujitani, Yamato, all of Japan

[73] Assignees: Nissan Motor Co., Ltd., Yokohama; Yamato Kogyo Co., Ltd., Yamato, both of Japan

[21] Appl. No.: 91,112

[22] Filed: Aug. 31, 1987

[30] Foreign Application Priority Data

Sep. 1, 1986 [JP] Japan .................. 61-205269

[51] Int. Cl.$^4$ .................. B60J 5/04
[52] U.S. Cl. .................. 296/188; 296/146; 52/630; 52/795; 256/73
[58] Field of Search .................. 296/146, 188, 189, 202, 296/207; 52/630, 801, 797, 795, 732, 720, 730; 49/501–503; 256/73; 188/371, 373, 377

[56] References Cited

U.S. PATENT DOCUMENTS

| 2,566,871 | 9/1951 | Bedford et al. ................ 49/502 |
| 4,090,734 | 5/1978 | Inami et al. ................ 296/146 |
| 4,409,771 | 10/1983 | Lowe ................ 52/732 X |
| 4,503,652 | 3/1985 | Turner ................ 52/732 X |
| 4,684,166 | 8/1987 | Kanodia ................ 296/188 X |
| 4,708,390 | 11/1987 | Palentyn et al. ................ 296/188 |
| 4,713,919 | 12/1987 | Platt ................ 52/732 X |

FOREIGN PATENT DOCUMENTS

| 2408459 | 8/1974 | Fed. Rep. of Germany ........ 49/501 |
| 2231533 | 1/1975 | France ................ 49/502 |
| 50-146221 | 12/1975 | Japan . |
| 50-147311 | 12/1975 | Japan . |
| 52-141721 | 10/1977 | Japan . |
| 06725 | 5/1981 | Japan ................ 296/202 |
| 50813 | 5/1981 | Japan ................ 296/188 |
| 57-47414 | 3/1982 | Japan . |
| 57-125633 | 8/1982 | Japan . |
| 57-168414 | 10/1982 | Japan . |

*Primary Examiner*—Dennis H. Pedder
*Attorney, Agent, or Firm*—Foley & Lardner, Schwartz, Jeffery, Schwaab, Mack, Blumenthal & Evans

[57] ABSTRACT

A vehicle door guard bar is formed out of a single plate and comprises an elongated main body portion having one side and an opposite side, a bent portion, and a reinforcement portion joined to the main body portion at the one side thereof via the bent portion and fixed to the main body portion. The bent portion has a tubular cross-section.

23 Claims, 6 Drawing Sheets

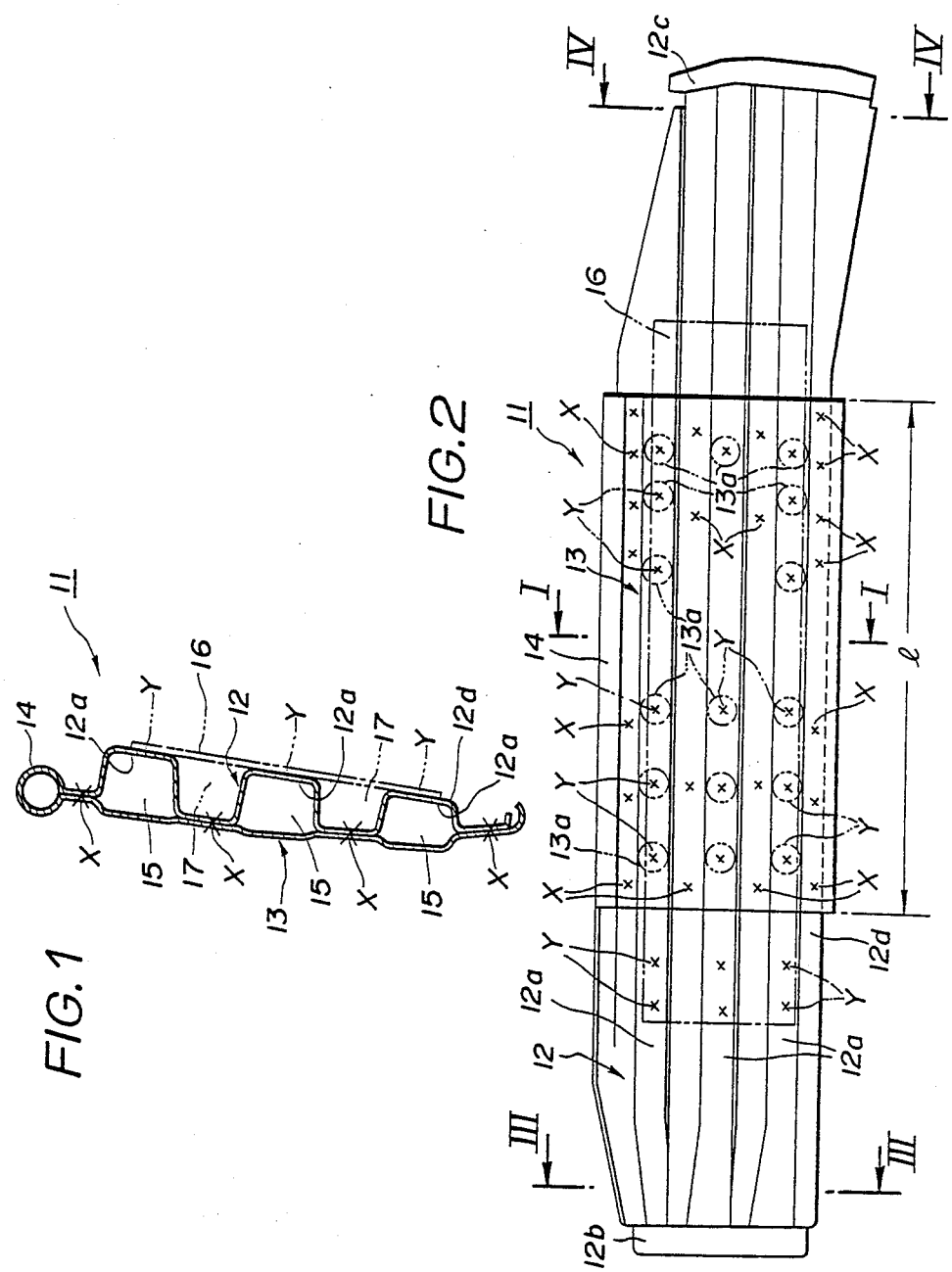

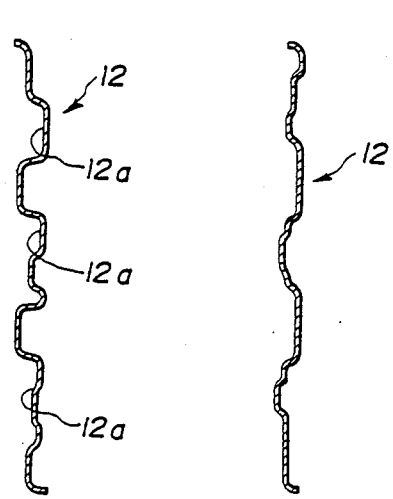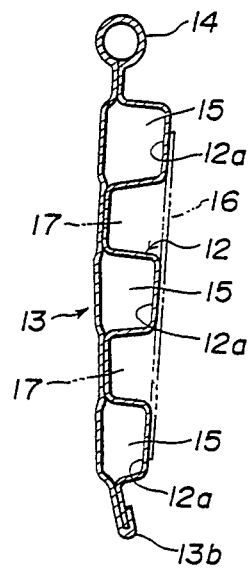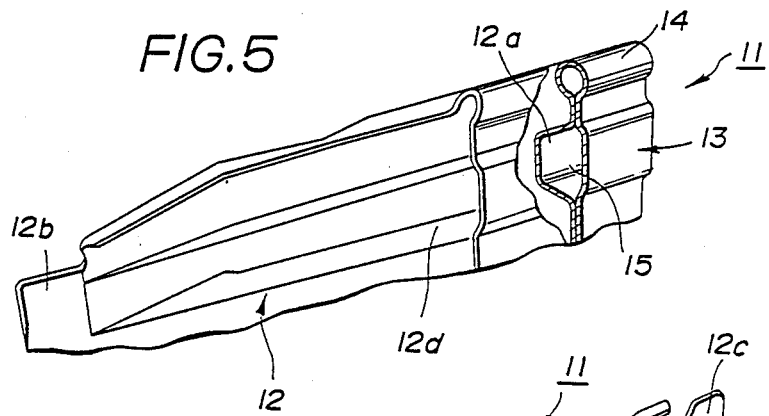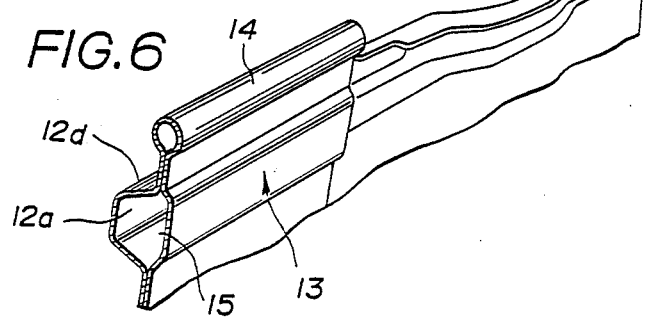

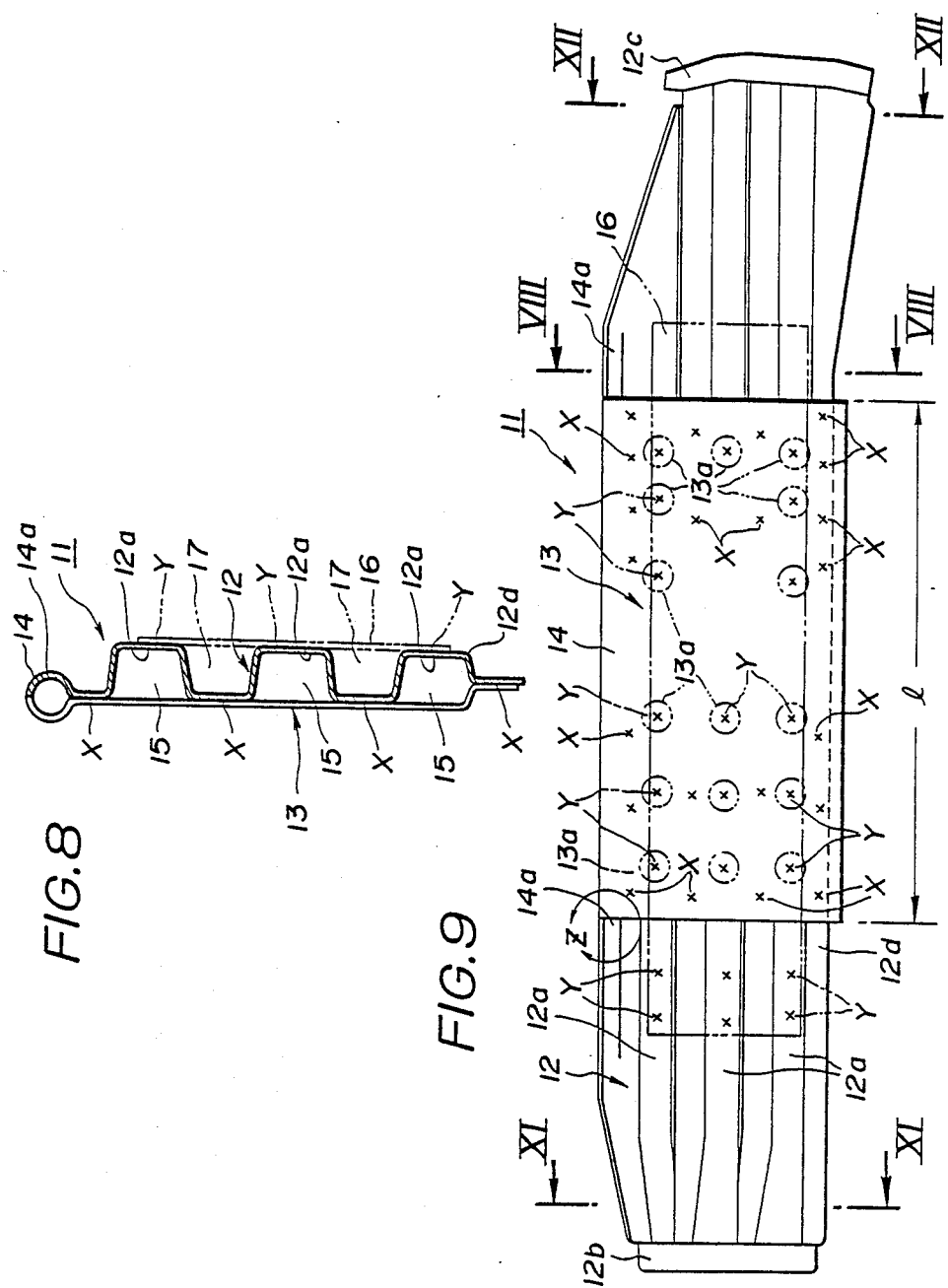

DOOR GUARD BAR

BACKGROUND OF THE INVENTION

The present invention relates to a vehicle door reinforcement, and more particularly to a vehicle door guard bar for protecting a vehicle occupant during lateral collision of the vehicle.

One conventional art of the above kind is hereinafter described referring to FIGS. 14 to 17. As best seen in FIG. 15, an automotive vehicle door 1 is formed mainly of an outer panel 2 and an inner panel 3. Within a space defined by these panels 2 and 3, a door guard bar 4 is arranged in such a manner as to extend in a longitudinal direction of the vehicle as will be readily understood from FIGS. 14 and 15.

With the door guard bar 4 arranged as mentioned above, the door 1 is reinforced for increased resistance to its damage during lateral collision of the vehicle. As shown in FIG. 16, the guard bar 4 is made up of a guard bar main body 5 and a reinforcement 6. This guard bar main body 5 is an assembly of three separate parts, i.e., a middle part 5a and front and rear end parts 5b, 5c, which are spot welded. Fixed, by spot or arc welding, to this guard bar main body 5 is the reinforcement 6. The door guard bar 4 as assembled as shown in FIG. 17, is securely attached to the door 1 with its front and rear end parts 5b, 5c fixed to the inner panel 3.

The conventional door guard bar 4 is an assembly of four separate parts, thus requiring a considerable number of pressing steps for production of the parts. Besides, a jig is needed in welding these parts, causing an increase in assembly cost. Accordingly, the present invention aims at providing a vehicle door guard bar free from the above-mentioned problems.

SUMMARY OF THE INVENTION

According to the present invention, a vehicle door guard bar is formed out of a single plate and comprises an elongated main body portion having one side and an opposite side, a bent portion, and a reinforcement portion joined to the main body portion at the one side thereof via the bent portion and fixed to the main body portion. The bent portion has a tubular cross-section.

BRIEF DESCRIPTION OF THE DRAWINGS

FIG. 1 is a section through the line I—I of FIG. 2;

FIG. 2 is a plan view of a first embodiment of a door guard bar;

FIG. 3 is a section through the line III—III of FIG. 2;

FIG. 4 is a section through the line IV—IV of FIG. 2;

FIG. 5 is a fragmentary perspective view of an upper and front end portion of the door guard bar;

FIG. 6 is a fragmentary perspective view of an upper and rear end portion of the door guard bar;

FIG. 7 is a similar view to FIG. 1 showing a second embodiment of a door guard bar;

FIG. 8 is a section through the line VIII—VIII of FIG. 9;

FIG. 9 is a plan view of a third embodiment of a door guard bar;

DESCRIPTION OF THE EMBODIMENTS

Figure 10:
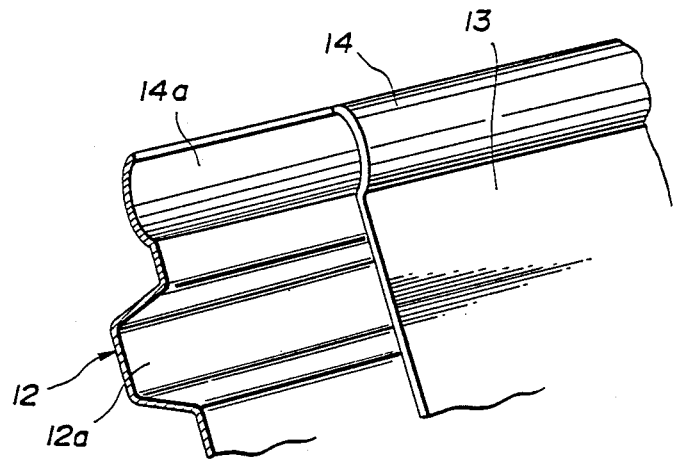
FIG. 10 is a fragmentary perspective enlarged view of a portion enclosed by a circle Z in FIG. 9.
Figure 11:
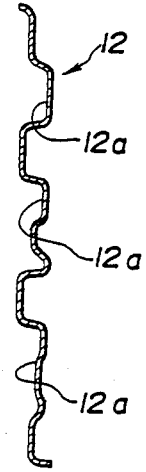
FIG. 11 is a section taken through the line XI—XI of FIG. 9.
Figure 12:
FIG. 12 is a section taken through the line XII—XII of FIG. 9.

Referring to FIGS. 1 to 6, the first embodiment is hereinafter described. Designated by the reference numeral 11 is a door guard bar according to the present invention. The door guard bar 11 is adapted to be arranged within a space defined between a door outer panel and a door inner panel in such a manner as to extend in a generally longitudinal direction of the vehicle.

As will be understood from the following description, the door guard bar 11 is formed out of a single metal plate such as by pressing. The door guard bar 11 includes an elongated main body portion 12, a reinforcement portion 13, and a bent portion 14 joining them. The main body portion 12 includes an elongated middle section 12d, a front end section 12b, and a rear end section 12c. The middle section 12d is corrugated to form a plurality of parallel grooves 12a running in the longitudinal direction. The front and rear end shorter sided sections 12b and 12c are adapted to be fixed to an inner panel of a door via brackets, not shown. The reinforcement section 13 has a width l and extends in the longitudinal direction of the middle section 12d. As best seen in FIG. 1, via the bent portion 14 the reinforcement portion 13 is joined along a first elongated lateral edge of the main body portion 12 and overlies a portion of the middle section 12d. As shown in FIG. 1, the reinforcement portion 13 may have recesses substantially parallel to the elongated lateral edges. Raised ridges on the elongated main body portion run parallel to the recesses of the reinforcement portion. The reinforcement portion 13 is fixed to the middle section 12d of the main body portion 12 at locations on ridges running in parallel and between the grooves as indicated by capital letters X by means of spot or arc welding. As will be understood from FIGS. 1, 5, and 6, the bent portion 14 is rounded and hollowed to form a tubular cross-section.

As compared to the before discussed conventional door guard bar 4, the door guard bar 11 has the following advantages: Since the reinforcement portion 13 is joined via the bent portion 14 to the main body portion, the number of processing steps has been decreased. Since the relative positioning of the reinforcement portion with respect to the main body portion 12 is effected by the bent portion 14, the positioning work using a jig is not necessary. Since the bent portion 14 obviates spot welding for joining them, the number of spot or arc welding points has been decreased.

Besides, since the bent portion 14 has a tubular cross-section, the rigidity of the door guard bar 11 has been increased.

Preferably, in order to further increase the rigidity, a patch 16 is fixed to the middle section 12d of the main body portion 12 by means of spot or arc welding at locations indicated by capital letters Y as seen in FIGS. 1 and 2. For ease of work in spot or arc welding, the reinforcement portion 13 is formed with a plurality of holes 13a illustrated by broken line in FIG. 2. With the patch 16 fixed to the middle section 12d, a plurality of closed cross-sectional spaces 17 are provided in addition to a plurality of closed cross-sectional spaces 15 (see FIG. 1). Thus, the rigidity is increased.

FIG. 7 shows a second embodiment which is substantially the same as the first embodiment except that a reinforcement portion 13 is fixed to a middle section 12d by means of a flat lock seam 13b formed by a second elongated lateral edge of the main body portion 12 and the adjacent side of the reinforcement portion 13. The fixing of the reinforcement portion 13 to the middle section 12d does not need spot or arc welding.

Referring to FIGS. 8 to 12, a third embodiment is described. This embodiment is substantially the same as the first embodiment except that a middle section 12d of a main body portion 12 is formed with rounded grooves 14a extending in the opposite directions from an area reinforced by a reinforcement portion 13. The rounded grooves 14a merge smoothly with a bent portion 14 as best seen in FIG. 10. The provision of such rounded grooves 14a makes it easy to form the bent portion 14 having a circular tubular cross-section. More specifically, the tubular bent portion 14 is prevented from collapsing owing to the rounded grooves 14a during bending process before fixing the reinforcement portion 13 to the middle section 12d of the main body portion 12. The stress concentration on the main body portion 12 is prevented by the rounded grooves 14a because the variation in strength between the area reinforced by the reinforcement portion 13 and the other areas which are not reinforced is made gradual.

Figure 13:
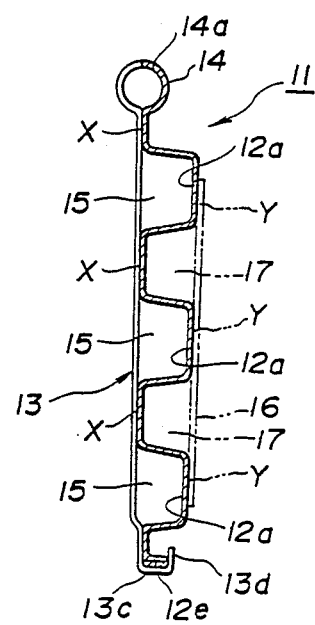
FIG. 13 is a similar view to FIG. 8 showing a fourth embodiment.
Figure 14:
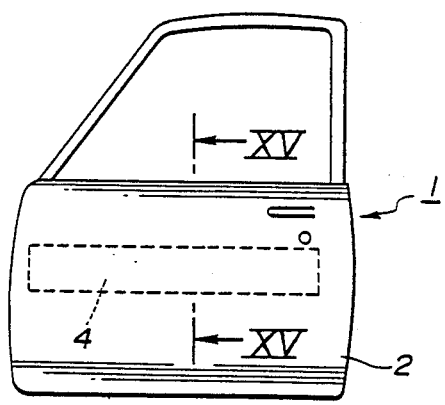
FIG. 14 is a plan view of a vehicle door.
Figure 15:
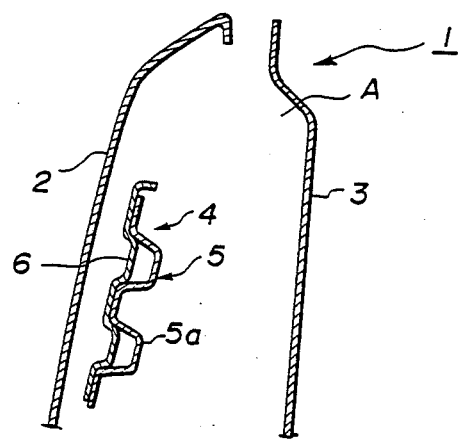
FIG. 15 is a section through the line XV—XV of FIG. 14 showing the conventional door guard bar discussed before.
Figure 16:
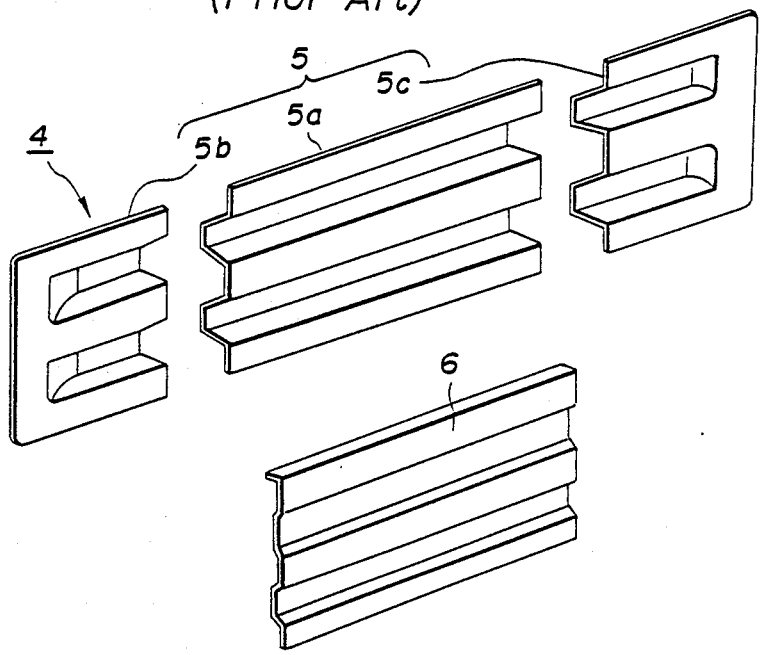
FIG. 16 is a perspective disassembled view of the conventional door guard bar.
Figure 17:
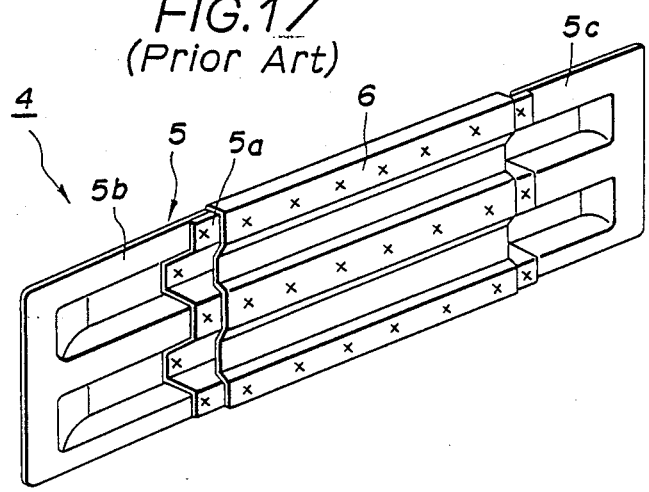
FIG. 17 is a perspective view of the assembled state of the conventional door guard bar.

FIG. 13 shows a fourth embodiment. According to this embodiment, in order to increase accuracy in positioning before spot or arc welding, a main body portion 12 is formed with an end flange 12e locked in a groove formed by a curled flange 13c with a standing wall 13d as shown in FIG. 13. Thus, spot or arc welding work is made easy because unfolding of the plate about the bent portion 14 is prevented. The other structure is the same as the third embodiment.

What is claimed is:

1. A vehicle door guard bar comprising:
   a non-planar elongated main body portion having a first shorter side, a second shorter side opposite to said first shorter side and first and second elongated lateral edges extending between said first and second shorter sides;
   a bent portion disposed along said first elongated lateral edge;
   a substantially planar reinforcement portion joined via said bent portion to said elongated main body portion;
   said elongated main body portion, said bent portion, and said reinforcement portion being formed out of a single plate;
   said reinforcement portion contacting said elongated main body portion at a plurality of locations spaced from said bent portion thereby defining a plurality of tubular hollow spaces between the reinforcement portion and the elongated main body portion; and
   said bent portion having a rounded cross-section.

2. A vehicle door guard bar as claimed in claim 1, wherein said reinforcement portion is fixed to said elongated main body portion at said plurality of locations by welding.

3. A vehicle door guard bar as claimed in claim 1, wherein said reinforcement portion is fixed to said elongated main body portion along said second elongated lateral edge thereof by a flat lock seam formed by said second lateral edge of said main body portion and an adjacent side of the reinforcement portion, said adjacent side having a portion bent around said second elongated lateral edge.

4. A vehicle door guard bar as claimed in claim 1, wherein said main body portion includes an elongated middle section extending between a first end section and a second end section, said middle section being corrugated to form a plurality of parallel grooves running in a longitudinal direction of said middle section, and a plurality of ridges running in parallel to said grooves.

5. A vehicle door guard bar as claimed in claim 4, wherein said reinforcement portion is welded to said middle section of said body portion at a plurality of locations on said ridges.

6. A vehicle door guard bar as claimed in claim 4, wherein said reinforcement portion is kept in abutting engagement with said middle section of said main body portion at said ridges by means of a flat lock seam formed by said second elongated lateral edge of said main body portion and an adjacent side of said reinforcement portion, said adjacent side having a portion bent around said second elongated lateral edges.

7. A vehicle door guard bar as claimed in claim 1, wherein said bent portion defines rounded grooves disposed along said first elongated lateral edge from an area reinforced by said reinforcement portion.

8. A vehicle door guard bar as claimed in claim 7, wherein said reinforcement portion is fixed to said elongated main body portion by welding.

9. A vehicle door guard bar as claimed in claim 1, wherein said reinforcement portion is formed with a curled flange with a standing wall, and said elongated main body portion is formed at said second side with an end flange locked in a groove formed by said curled flange with said standing wall.

10. A vehicle door guard bar as claimed in claim 9, wherein said reinforcement portion is welded to said elongated main body.

11. A vehicle door guard bar as claimed in claim 1, further comprising a patch fixed to said elongated main body portion.

12. The vehicle door guard bar according to claim 1, wherein said reinforcement portion forms a plurality of parallel recesses substantially parallel to said elongated lateral edges and contacting said elongated main body portion at said plurality of locations, and a plurality of raised ridges running parallel to said recesses.

13. A vehicle door comprising:
   an inner panel;
   an outer panel; and
   a door guard bar structure disposed therebetween, said door guard bar structure comprising:
   (a) a substantially vertical non-planar elongated main body portion having a first shorter side, a second shorter side opposite to said first shorter side and first and second elongated lateral edges extending between said first and second shorter sides;
   (b) a bent portion disposed along said first elongated lateral edge;

(c) a substantially planar and vertical reinforcement portion joined via said bent portion to said elongated main body portion;

said elongated main body portion, said bent portion, and said reinforcement portion being formed out of a single plate;

said reinforcement portion contacting said elongated main body portion at a plurality of locations spaced from said bent portion thereby defining a plurality of tubular hollow spaces between the reinforcement portion and the elongated main body portion;

said bent portion having a rounded cross-section;

said door guard bar structure adapted to be fixed to said inner panel at least at said first and second shorter sides of said elongated main body portion.

14. A vehicle door as claimed in claim 13, wherein said reinforcement portion is fixed to said elongated main body portion at said plurality of locations by welding.

15. A vehicle door as claimed in claim 13, wherein said reinforcement portion is fixed to said elongated main body portion along said second elongated lateral edge thereof by a flat lock seam formed by said second lateral edge of said main body portion and an adjacent side of the reinforcement portion, said adjacent side having a portion bent around said second elongated lateral edge.

16. A vehicle door as claimed in claim 13, wherein said main body portion includes an elongated middle section extending between a first end section and a second end section, said middle section being corrugated to form a plurality of parallel grooves running in a longitudinal direction of said middle section, and a plurality of ridges running in parallel to said grooves.

17. A vehicle door as claimed in claim 16, wherein said reinforcement portion is welded to said middle section of said body portion at a plurality of locations on said ridges.

18. A vehicle door as claimed in claim 16, wherein said reinforcement portion is kept in abutting engagement with said middle section of said main body portion at said ridges by means of a flat lock seam formed by said second elongated lateral edge of said main body portion and an adjacent side of said reinforcement portion, said adjacent side having a portion bent around said second elongated lateral edge.

19. A vehicle door as claimed in claim 13, wherein said bent portion defines rounded grooves disposed along said first elongated lateral edge from an area reinforced by said reinforcement portion.

20. A vehicle door as claimed in claim 19, wherein said reinforcement portion is fixed to said elongated main body portion by welding.

21. A vehicle door as claimed in claim 13, wherein said reinforcement portion is formed with a curled flange with a standing wall, and said elongated main body portion is formed at said second side with an end flange locked in a groove formed by said curled flange with said standing wall.

22. A vehicle door as claimed in claim 21, wherein said reinforcement portion is welded to said elongated main body.

23. A vehicle door as claimed in claim 13, further comprising a patch fixed to said elongated main body portion.

* * * * *